(12) United States Patent
Fernandez et al.

(10) Patent No.: US 12,473,236 B2
(45) Date of Patent: Nov. 18, 2025

(54) INTERNAL TOOLING CONFIGURATION FOR THE CREATION OF Z-CHANNELS IN WOVEN CERAMIC MATRIX COMPOSITE PREFORMS

(71) Applicant: RTX Corporation, Farmington, CT (US)

(72) Inventors: Robin H. Fernandez, East Haddam, CT (US); John D. Riehl, Hebron, CT (US); Molly Kole, Hartford, CT (US)

(73) Assignee: RTX Corporation, Farmington, CT (US)

( * ) Notice: Subject to any disclaimer, the term of this patent is extended or adjusted under 35 U.S.C. 154(b) by 147 days.

(21) Appl. No.: 18/491,578

(22) Filed: Oct. 20, 2023

(65) Prior Publication Data
US 2025/0128990 A1    Apr. 24, 2025

(51) Int. Cl.
*C04B 35/80*    (2006.01)
*B26F 1/24*    (2006.01)
(Continued)

(52) U.S. Cl.
CPC ............... *C04B 35/80* (2013.01); *B26F 1/24* (2013.01); *B28B 1/42* (2013.01); *B28B 1/52* (2013.01);
(Continued)

(58) Field of Classification Search
CPC ..... B29C 70/545; B29C 70/549; C04B 35/80; B26F 1/24; B28B 1/42; B28B 1/52;
(Continued)

(56) References Cited

U.S. PATENT DOCUMENTS 2,289,177 A * 7/1942 Chandler .................. B26F 1/24
                                                      264/156
2,611,434 A * 9/1952 Mugler ..................... B26F 1/02
                                                      219/229
(Continued)

FOREIGN PATENT DOCUMENTS

| CN | 108215246 A | * | 6/2018 | ........... B29C 70/342 |
| EP | 2067757 B1 | | 1/2013 | |
| EP | 4344843 A1 | | 4/2024 | |

OTHER PUBLICATIONS

Extended European Search Report for EP Application No. 24201100. 5, dated Feb. 19, 2025, 7 pages,.
(Continued)

*Primary Examiner* — Benjamin A Schiffman
(74) *Attorney, Agent, or Firm* — Kinney & Lange, P.A.

(57) ABSTRACT

A tooling assembly for use in forming z-channels in a fibrous ceramic preform includes a mandrel having a first plurality of holes extending into a mandrel body, a first subset of the plurality of holes being through-holes extending completely through the mandrel, and a second subset of the holes comprising blind pockets, and a plurality of channels extending longitudinally along the mandrel in a direction orthogonal to the first plurality of holes. The tooling assembly further includes an outer fixture at least partially enclosing the mandrel, the outer fixture including at least one piece comprising a second plurality of holes extending completely through the at least one piece, the second plurality of holes being aligned with respective corresponding ones of the first plurality of holes such that a needle can be inserted through each of the second plurality of holes in the at least one piece and into the respective ones of the first plurality of holes in the mandrel.

11 Claims, 4 Drawing Sheets

(51) Int. Cl.
| | |
|---|---|
| *B28B 1/42* | (2006.01) |
| *B28B 1/52* | (2006.01) |
| *B28B 7/00* | (2006.01) |
| *B28B 7/18* | (2006.01) |
| *B28B 7/28* | (2006.01) |
| *B28B 11/00* | (2006.01) |
| *B29C 70/54* | (2006.01) |
| *C04B 35/628* | (2006.01) |
| *C04B 35/64* | (2006.01) |
| *C04B 35/657* | (2006.01) |

(52) U.S. Cl.
CPC ............ *B28B 1/522* (2013.01); *B28B 7/0082* (2013.01); *B28B 7/18* (2013.01); *B28B 7/28* (2013.01); *B28B 11/006* (2013.01); *B29C 70/545* (2013.01); *B29C 70/549* (2021.05); *C04B 35/62884* (2013.01); *C04B 35/64* (2013.01); *C04B 35/657* (2013.01); *C04B 2235/5256* (2013.01); *C04B 2235/614* (2013.01); *C04B 2235/616* (2013.01); *F05D 2300/6033* (2013.01)

(58) Field of Classification Search
CPC ......... B28B 1/522; B28B 7/0082; B28B 7/18; B28B 7/28
See application file for complete search history.

(56) References Cited

U.S. PATENT DOCUMENTS

| | | | | |
|---|---|---|---|---|
| 4,486,372 A * | 12/1984 | Millard | ............... | B29C 33/0033 264/156 |
| 4,923,547 A | 5/1990 | Yamaji et al. | | |
| 5,066,442 A * | 11/1991 | Gutowski | ............. | B29C 51/004 264/273 |
| 5,188,625 A * | 2/1993 | Van Iten | ........... | A61F 13/15577 604/383 |
| 5,246,520 A * | 9/1993 | Scanlon | ................ | B29C 70/504 156/252 |
| 5,372,494 A * | 12/1994 | Vaughan | .................... | B26F 1/24 425/290 |
| 5,372,668 A * | 12/1994 | Bracesco | ............. | B29C 63/025 297/DIG. 2 |
| 5,560,881 A * | 10/1996 | Hillman | .................. | B28B 7/346 264/225 |
| 5,580,505 A * | 12/1996 | Carswell | ............. | C04B 35/6316 249/141 |
| 5,740,593 A | 4/1998 | Sheehan et al. | | |
| 6,083,436 A * | 7/2000 | Thompson | ............ | F16D 65/126 264/109 |
| 6,190,602 B1 * | 2/2001 | Blaney | .................. | B29C 70/545 156/303.1 |
| 6,203,738 B1 * | 3/2001 | Vaders | ...................... | B27N 3/08 264/293 |
| 7,332,116 B2 * | 2/2008 | Petervary | ................ | B32B 18/00 425/290 |
| 7,576,035 B2 * | 8/2009 | Ohno | ........................ | B28B 7/18 423/325 |
| 7,993,477 B2 | 8/2011 | Hethcock et al. | | |
| 7,997,891 B2 * | 8/2011 | Gallagher | ............. | B29C 33/302 264/553 |
| 8,128,775 B2 * | 3/2012 | Maheshwari | ........... | B29C 43/10 156/212 |
| 8,216,641 B2 * | 7/2012 | Bouchard | ............. | F16D 69/023 427/249.4 |
| 9,017,761 B2 * | 4/2015 | La Forest | ............... | C04B 35/83 427/249.1 |
| 9,546,438 B2 * | 1/2017 | Fiala | ........................ | D04H 1/46 |
| 10,005,246 B2 * | 6/2018 | Stepanski | ................ | B29C 51/02 |
| 10,774,005 B2 * | 9/2020 | Propheter-Hinckley | ..................... | C04B 35/80 |
| 11,608,748 B2 * | 3/2023 | Liles | ........................ | C04B 35/80 |
| 11,648,740 B2 | 5/2023 | Most et al. | | |
| 11,655,193 B2 * | 5/2023 | Diss | ........................ | B28B 1/008 264/645 |
| 2003/0121380 A1 * | 7/2003 | Cowell | ............. | A61F 13/15707 83/660 |
| 2003/0136502 A1 | 7/2003 | Lavasserie et al. | | |
| 2014/0260438 A1 | 9/2014 | Matsumura | | |
| 2016/0046085 A1 | 2/2016 | Collart et al. | | |
| 2019/0283271 A1 * | 9/2019 | Tsuru | ...................... | F01D 5/282 |
| 2022/0356125 A1 | 11/2022 | Fernandez | | |
| 2023/0193772 A1 * | 6/2023 | Wang | ...................... | F01D 9/065 29/889.721 |
| 2023/0391680 A1 * | 12/2023 | Callaway | ................ | B29B 11/00 |
| 2024/0109223 A1 | 4/2024 | Lenz | | |
| 2024/0300142 A1 * | 9/2024 | White, III | ............... | B28B 21/48 |
| 2024/0300861 A1 * | 9/2024 | Konopaske | .......... | B26D 1/0006 |
| 2024/0308921 A1 * | 9/2024 | Lenz | ......................... | C04B 35/80 |
| 2024/0308922 A1 * | 9/2024 | Kole | ......................... | D04H 18/02 |
| 2024/0344255 A1 * | 10/2024 | Fernandez | ............... | B26F 1/24 |
| 2025/0128466 A1 * | 4/2025 | Kole | ......................... | B26F 1/24 |

OTHER PUBLICATIONS

Extended European Search Report for EP Application No. 24201195. 5, dated Mar. 18, 2025, 7 pages,.

* cited by examiner

INTERNAL TOOLING CONFIGURATION FOR THE CREATION OF Z-CHANNELS IN WOVEN CERAMIC MATRIX COMPOSITE PREFORMS

BACKGROUND

The present invention relates to the fabrication of ceramic matrix composites (CMCs) and, more particularly, to CMCs having improved properties for operating in gas turbine engines.

In the processing of CMCs, there is a need to infiltrate matrix within and around fibrous tow bundles to replace pore volume with dense matrix material. In a woven system, large voids often exist between adjacent tows of a preform. Such voids can become large defects after infiltration of the composite that are detrimental to composite properties. The pore network through a woven system is often highly tortuous for infiltrating reactant gases, which leads to uneven deposition through the thickness of the preform. The formation of z-channels can create more direct pathways for reactant gases. One current technique for z-channel formation includes piercing a fibrous preform in the through-thickness direction with a needle. However, the internal tooling required for certain components can obstruct the needle pathway, preventing it from fully piercing the preform. As such, improved tooling designs are desirable.

SUMMARY

A tooling assembly for use in forming z-channels in a fibrous ceramic preform includes a mandrel having a first plurality of holes extending into a mandrel body, a first subset of the plurality of holes being through-holes extending completely through the mandrel, and a second subset of the holes comprising blind pockets, and a plurality of channels extending longitudinally along the mandrel in a direction orthogonal to the first plurality of holes. The tooling assembly further includes an outer fixture at least partially enclosing the mandrel, the outer fixture including at least one piece comprising a second plurality of holes extending completely through the at least one piece, the second plurality of holes being aligned with respective corresponding ones of the first plurality of holes such that a needle can be inserted through each of the second plurality of holes in the at least one piece and into the respective ones of the first plurality of holes in the mandrel.

A method of forming z-channels in a fibrous ceramic preform includes mounting a ceramic fabric on a mandrel, securing an outer fixture about the mandrel and the ceramic fabric such that the outer fixture at least partially encloses the mandrel and the ceramic fabric, inserting a needle sequentially through a first hole in the outer fixture, a wall of the preform defined by the ceramic fabric, and a corresponding second hole in the mandrel, and repeating the previous step with a plurality of needles for a plurality of first holes and corresponding second holes.

Figure 1:
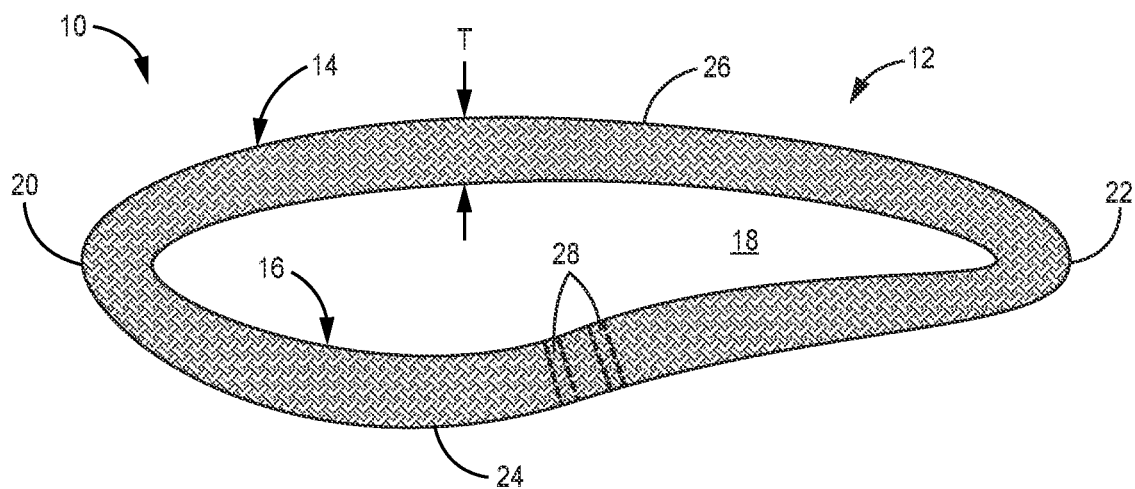
FIG. 1 is a simplified cross-sectional illustration of an airfoil preform for a blade or vane.

While the above-identified figures set forth one or more embodiments of the present disclosure, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features and components not specifically shown in the drawings.

DETAILED DESCRIPTION

This disclosure presents a tooling assembly designed for use with z-channeling needles. The tooling assembly includes internal and external fixtures with aligned holes for receiving needles.

FIG. 1 is a simplified cross-sectional view of preform 10, formed from tows of ceramic (e.g., silicon carbide) fibers arranged in a uni- or multi-axial braided architecture, or various two or three-dimensional woven architectures such as plain, harness (e.g., 3, 5, 8, etc.), twill, or non-symmetric to name a few non-limiting examples. Non-woven architectures (e.g., chopped, felted, etc.) are also contemplated herein. Preform 10 includes continuous wall 12 with outer surface 14, inner surface 16, and thickness T defined there between. Wall 12 defines hollow interior 18. Wall 12 has a curved geometry, and as shown, is shaped like an airfoil, with leading edge 20, oppositely disposed trailing edge 22, pressure side 24, and oppositely disposed suction side 26. Preform 10 can, accordingly, be an airfoil preform for a vane or blade. Other types of curved preforms, such as a blade outer airseal (BOAS) are contemplated herein. Preform 10 can be formed by laying up a fibrous ceramic fabric or braiding a fibrous ceramic fabric over a mandrel (e.g., mandrel 34 of FIGS. 3 and 4) with a shape corresponding to hollow interior 18, such that the mandrel occupies hollow interior 18. The mandrel supports preform 10 and prevents warping or other damage to preform 10 through densification with a ceramic (e.g., silicon carbide) matrix. It can be beneficial to form through-thickness z-channels 28 (two are represented in FIG. 1 in dashed lines) through wall 12 to facilitate the flow of reactant gases during densification, allowing improved densification of the laminate. However, a solid mandrel, such as the type typically used in fabrication of complex CMC components with hollow features can impede the insertion of z-channeling needles completely through wall 12.

Figure 2:
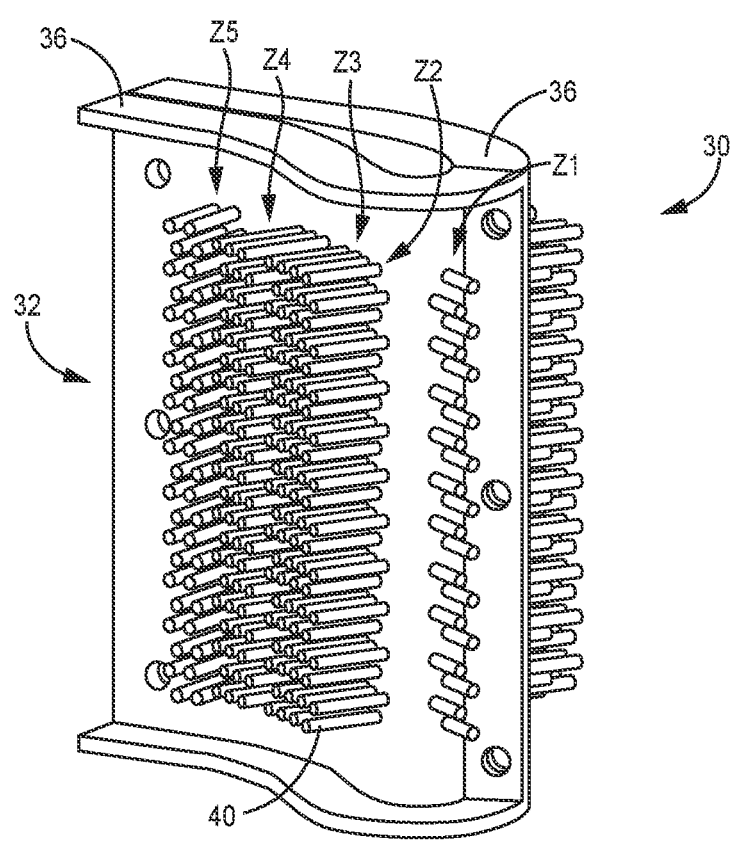
FIG. 2 is a perspective view of a tooling assembly used for perforating the airfoil preform of FIG. 1 with z-channels.
Figure 3:
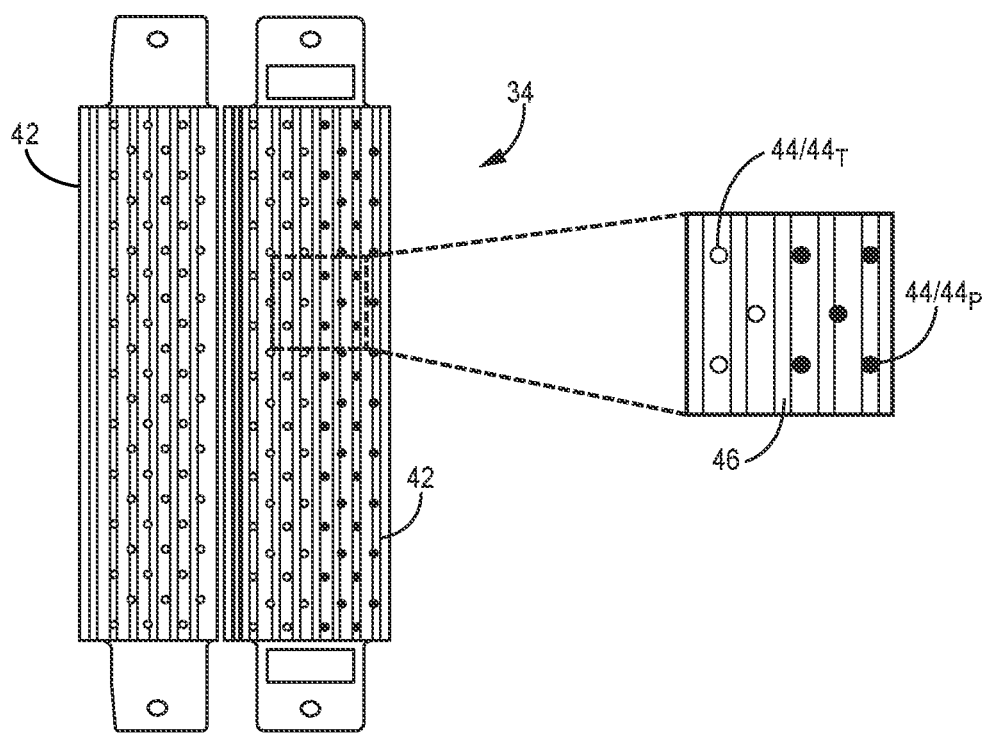
FIG. 3 is an elevation view of a mandrel belonging to the tooling assembly of FIG. 2.
Figure 4:
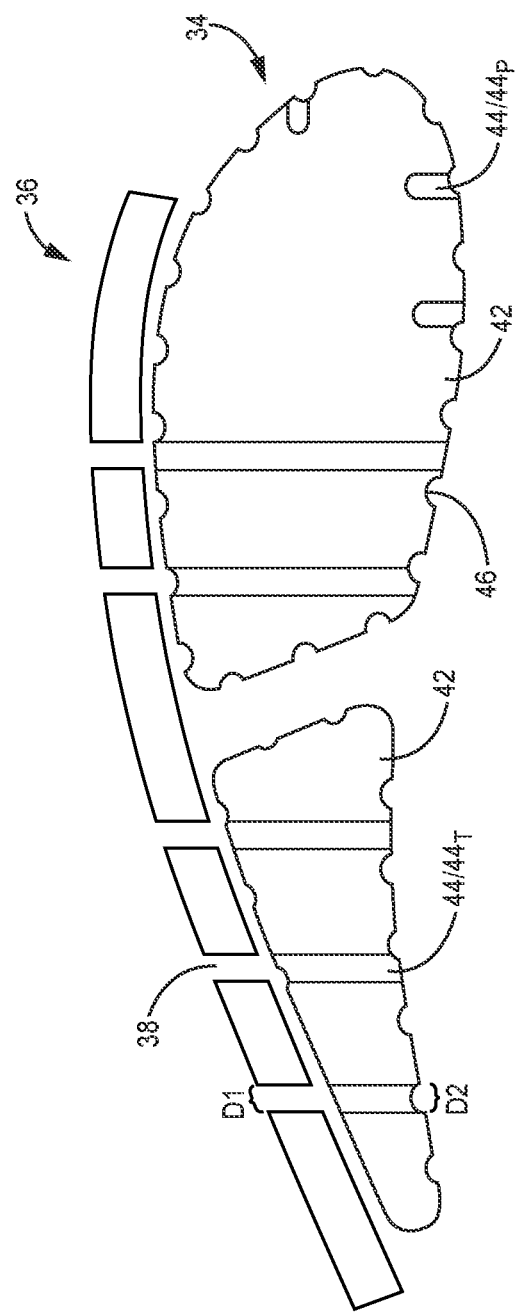
FIG. 4 is a simplified cross-sectional illustration of the mandrel of FIG. 3 and one portion of an outer fixture of the tooling assembly of FIG. 2.

FIGS. 2-4 illustrate various fixtures of a tooling assembly intended to overcome the aforementioned challenges. FIG. 2 is a perspective view of tooling assembly 30 showing outer fixture 32. FIG. 3 is an elevation view of mandrel (i.e., inner fixture) 34 showing a subset of holes 44 in greater detail. FIG. 4 is a cross-sectional view of mandrel 34 and one piece 36 of outer fixture 32. FIGS. 2-4 are discussed together with continued reference to FIG. 1.

Outer fixture 32 generally surrounds preform 10 and mandrel 34, neither of which is visible in FIG. 2. Outer fixture 32 can have a geometry corresponding to preform 10 (i.e., an airfoil-shaped geometry). Outer fixture 32 can include multiple (e.g., two) pieces 36 to facilitate assembly around complexly shaped preforms, such as preform 10. A first piece 36 extends along suction side 26 of preform 10, and a second piece 36 extends along pressure side 24 and leading edge 20. Pieces 36 can be held together by any suitable securing means, such as fasteners, clamps, clips, lids etc. Outer fixture 32 can be perforated with holes 38 (visible in FIG. 4) for receiving needles 40, shown as inserted into tooling assembly 30 and preform 10. Holes 38 can be incorporated throughout tooling assembly 30, based on the number and location of z-channels 28 desired for a particular preform 10. Outer fixture 32 can be formed from a 3D printed/injection molded plastic, metal, or graphite.

Mandrel 34 can be formed as two pieces 42 in an exemplary embodiment, which as shown in FIGS. 3 and 4, includes leading edge piece 42 and trailing edge piece 42. Such a multipiece configuration can be beneficial for accommodating features of an airfoil preform 10, such as a rib (not shown) extending between pressure side 24 and suction side 26. Mandrel 34 can be formed as a single piece 42, or as more than two pieces 42 in an alternative embodiment. Mandrel 34 includes holes 44 corresponding to/aligned with holes 38 of outer fixture 32, as best seen in FIG. 4. This allows for the full penetration of needles 40 through wall 12 of preform 10 to form z-channels 28. Holes 44 can include a mixture of through holes 44r, extending completely through mandrel 34, and blind pockets 44p, which do not extend completely through mandrel 34. Both types of holes 44 permit the full penetration of a respective needle 40 through wall 12 of preform 10, while mitigating interference from multiple needles 40 extending into mandrel 34 at various angles, as is discussed in greater detail below. Mandrel 34 further includes channels 46 about its periphery, extending generally orthogonally to holes 44 in a longitudinal direction of mandrel 34. Channels 46 can provide an additional pathway for reactant gases along inner surface 16 of wall 12 during densification, as mandrel 34 can be used to support preform 10 through densification. As such, mandrel 34 can preferably be formed from graphite.

Each hole 38 of outer fixture 32 can be generally cylindrical with a first diameter D1. Each hole 44 of mandrel 34 can be generally cylindrical with a second diameter D2. D1 can be equal to D2 in one embodiment. Alternatively, D2 can be less than D1 to prevent "pillowing" of fibers from preform 10 into holes 44 during densification. Generally speaking, however, D1 and D2, as well as the overall shape of holes 38 and 44 will be designed to accommodate needles 40. It should be noted that holes 38 and/or 44 need not necessarily be cylindrical in order to receive a respective needle 40, but can have other geometries with curved and/or straight edges. As such diameters D1 and/or D2 can be other dimensions, such as channel widths, as appropriate.

In general, it can be preferable to insert each needle 40 such that it is normal to outer surface 14 of wall 12. In some embodiments, at least some needles 40 can be inserted within 5 degrees of normal (i.e., 0 to 5 degrees), or 10 degrees of normal (i.e., 0 to 10 degrees). In yet other embodiments, at least some needles 40 can be inserted within 15 degrees of normal (i.e., 0 to 15 degrees). Because of the curvature of preform 10 and tooling fixture 30, holes 38 and 44 can be arranged in groups, or zones based on their relative angles and/or needle 40 pathway through tooling assembly 30 in order to achieve a desired angle of entry. FIG. 2 shows needles 40 arranged into such zones. More specifically, needles 40 aligned with leading edge 20 of preform 10 form first zone Z1. Moving aft and onto pressure side 24 are zones Z2, Z3, Z4, and Z5. Zone Z1, as shown, is angled about 90 degrees from zone Z2. In general, some zones can be disposed at non-zero angles relative to other zones. A particular zone can have a counterpart on both sides of tooling assembly 30 (i.e., corresponding to pressure side 24 and suction side 26 of preform 10), in particular where needles 40 traverse through holes 44T in mandrel 34 such that they extend completely through tooling assembly 30. Unpaired zones (e.g., Z1) can exist where needles 40 extend into blind pockets 44p. As shown, zones include a generally longitudinal distribution of respective holes 38, 44, and needles 40, but can be orthogonally (i.e., horizontally) disposed in an alternative embodiment.

During fabrication of a CMC component, preform 10 can be laid up/braided over mandrel 34, as discussed above. Outer fixture 32 can be assembled around preform 10 and mandrel 34 and secured in place. Needles 40 can then be inserted into holes 38 and corresponding holes 44. Needles 40 can then be removed, and outer fixture 32 disassembled and removed. Finally, preform 10 still mounted on mandrel 34, and with z-channels 28, can undergo densification via chemical vapor infiltration (CVI), or other methodology, such as melt infiltration or polymer infiltration and pyrolysis. It should be noted that a graphite outer fixture 32 can be left in place through densification. CMC components fabricated using tooling assembly 30 and needles 40 can be incorporated into aerospace, maritime, or industrial equipment, to name a few, non-limiting examples.

Discussion of Possible Embodiments

The following are non-exclusive descriptions of possible embodiments of the present invention.

A tooling assembly for use in forming z-channels in a fibrous ceramic preform includes a mandrel having a first plurality of holes extending into a mandrel body, a first subset of the plurality of holes being through-holes extending completely through the mandrel, and a second subset of the holes comprising blind pockets, and a plurality of channels extending longitudinally along the mandrel in a direction orthogonal to the first plurality of holes. The tooling assembly further includes an outer fixture at least partially enclosing the mandrel, the outer fixture including at least one piece comprising a second plurality of holes extending completely through the at least one piece, the second plurality of holes being aligned with respective corresponding ones of the first plurality of holes such that a needle can be inserted through each of the second plurality of holes in the at least one piece and into the respective ones of the first plurality of holes in the mandrel.

The tooling assembly of the preceding paragraph can optionally include, additionally and/or alternatively, any one or more of the following features, configurations and/or additional components:

In the above tooling assembly, the at least one piece of the outer fixture can include a first piece removably securable to a second piece.

In any of the above tooling assemblies, the outer fixture can be formed from one of plastic, metal, and graphite.

In any of the above tooling assemblies, the mandrel can be a multipiece mandrel including a first mandrel piece and a second mandrel piece.

In any of the above tooling assemblies, the mandrel can be formed form graphite.

In any of the above tooling assemblies, each of the first plurality of holes can have a first diameter.

In any of the above tooling assemblies, each of the second plurality of holes can have a second diameter.

In any of the above tooling assemblies, the first diameter can be the same as the second diameter.

In any of the above tooling assemblies, the first diameter can be greater than the second diameter.

In any of the above tooling assemblies, at least a subset of the first plurality of holes can be oriented such that a needle can be inserted within 10 degrees of normal to an outer surface of preform supported by the mandrel.

In any of the above tooling assemblies, at least a subset of the first plurality of holes can be oriented such that a needle can be inserted within 15 degrees of normal to an outer surface of preform supported by the mandrel.

A method of forming z-channels in a fibrous ceramic preform includes mounting a ceramic fabric on a mandrel, securing an outer fixture about the mandrel and the ceramic fabric such that the outer fixture at least partially encloses the mandrel and the ceramic fabric, inserting a needle sequentially through a first hole in the outer fixture, a wall of the preform defined by the ceramic fabric, and a corresponding second hole in the mandrel, and repeating the previous step with a plurality of needles for a plurality of first holes and corresponding second holes.

The method of the preceding paragraph can optionally include, additionally and/or alternatively, any one or more of the following features, configurations and/or additional steps:

The above method can further include removing each of the plurality of needles.

In any of the above methods, the step of inserting the needle can include inserting the needle sequentially through the first hole in the outer fixture, a first wall of the preform defined ceramic fabric, the corresponding second hole in the mandrel, an opposing second wall of the preform defined by the ceramic fabric, and a third hole in the outer fixture corresponding to the first hole.

In any of the above methods, when inserted, a first plurality of needles can be disposed at a non-zero angle relative to a second plurality of needles.

In any of the above methods, a third plurality of needles can be disposed at a non-zero angle relative to the first plurality of needles and the second plurality of needles.

In any of the above methods, the step of inserting the needle can further include inserting the needle within 10 degrees of normal to an outer surface of the wall of the preform.

In any of the above methods, the step of inserting the needle can further include inserting the needle within 15 degrees of normal to an outer surface of the wall of the preform.

A method of forming a ceramic matrix composite component includes densifying the fibrous ceramic preform of any of the above methods with a matrix.

In the above method, the step of densifying the fibrous ceramic preform can be carried out using at least one of chemical vapor infiltration, melt infiltration, and polymer infiltration and pyrolysis.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A tooling assembly for use in forming z-channels in a fibrous ceramic preform, the tooling assembly comprising:
   a mandrel having:
      a first plurality of holes extending into a mandrel body, a first subset of the plurality of holes being through-holes extending completely through the mandrel, and a second subset of the holes comprising blind pockets; and
      a plurality of channels extending longitudinally along the mandrel in a direction orthogonal to the first plurality of holes; and
   an outer fixture at least partially enclosing the mandrel, the outer fixture comprising:
      at least one piece comprising a second plurality of holes extending completely through the at least one piece, the second plurality of holes being aligned with respective corresponding ones of the first plurality of holes such that a needle can be inserted through each of the second plurality of holes in the at least one piece and into the respective ones of the first plurality of holes in the mandrel.

2. The tooling assembly of claim 1, wherein the at least one piece of the outer fixture comprises a first piece removably securable to a second piece.

3. The tooling assembly of claim 1, wherein the outer fixture is formed from one of plastic, metal, and graphite.

4. The tooling assembly of claim 1, wherein the mandrel is a multipiece mandrel comprising a first mandrel piece and a second mandrel piece.

5. The tooling assembly of claim 1, wherein the mandrel is formed form graphite.

6. The tooling assembly of claim 1, wherein each of the first plurality of holes has a first diameter.

7. The tooling assembly of claim 6, wherein each of the second plurality of holes has a second diameter.

8. The tooling assembly of claim 7, wherein the first diameter is the same as the second diameter.

9. The tooling assembly of claim 7, wherein the first diameter is greater than the second diameter.

10. The tooling assembly of claim 1, wherein at least a subset of the first plurality of holes is oriented such that a needle can be inserted within 10 degrees of normal to an outer surface of preform supported by the mandrel.

11. The tooling assembly of claim 1, wherein at least a subset of the first plurality of holes is oriented such that a needle can be inserted within 15 degrees of normal to an outer surface of preform supported by the mandrel.

* * * * *

UNITED STATES PATENT AND TRADEMARK OFFICE
CERTIFICATE OF CORRECTION

| | | |
|---|---|---|
| PATENT NO. | : 12,473,236 B2 | Page 1 of 1 |
| APPLICATION NO. | : 18/491578 | |
| DATED | : November 18, 2025 | |
| INVENTOR(S) | : Robin H. Fernandez, John D. Riehl and Molly Kole | |

It is certified that error appears in the above-identified patent and that said Letters Patent is hereby corrected as shown below:

In the Specification

Column 3, Line 23:
Delete "44r"
Insert --44T--

Signed and Sealed this
Sixteenth Day of December, 2025

John A. Squires
*Director of the United States Patent and Trademark Office*